Nov. 22, 1949 — W. F. SURGI — 2,489,059

LAWN MOWER GRASS STOP

Filed Oct. 22, 1946

INVENTOR
WILLIAM F. SURGI
BY
John E. Hubbell
ATTORNEY

Patented Nov. 22, 1949

2,489,059

UNITED STATES PATENT OFFICE 2,489,059

LAWN MOWER GRASS STOP

William F. Surgi, New Orleans, La.

Application October 22, 1946, Serial No. 704,947

5 Claims. (Cl. 56—25.4)

The general object of the present invention is to provide a lawn mower of the type comprising horizontal cutting blades revolving about a vertical axis, with simple and effective means for preventing an objectionable dispersion of the severed grass blades.

In the operation of a lawn mower of the type specified, the cutting blades revolve with a relatively high velocity over an annular zone surrounding and displaced from the vertical cutter axis. In normal operation, most of the severed grass blades are thrown with considerable velocity to one side of the path of the movement of the lawn mower, as a result of centrifugal force and the fan action of the cutter. During portions of most lawn mowing operations, objectional scattering of the severed grass blades is prevented, or substantially minimized, by the uncut grass at the side of the lawn mower toward which the severed blades are thrown. Heretofore, however, in practically every lawn mowing operation, there has been an objectionable scattering of grass blades over the ground in the final portion, at least of the operation, except when the lawn mower has been provided with an effective grass catching or collecting device. I have discovered, however, that it is practically feasible to prevent scattering of the severed grass blades by means simpler, lighter in weight and less expensive to construct than an effective lawn mower grass catching attachment, and consisting essentially of a baffle or grass arresting curtain carried by the lawn mower at the side of the latter toward which the grass blades are thrown.

The various features of novelty which characterize my invention are pointed out with particularity in the claims annexed to, and forming a part of this specification. For a better understanding of the invention, however, its advantages and specific objects attained by its use, reference should be had to the accompanying drawing and descriptive matter in which I have illustrated and described a preferred form of the present invention.

Figure 1:
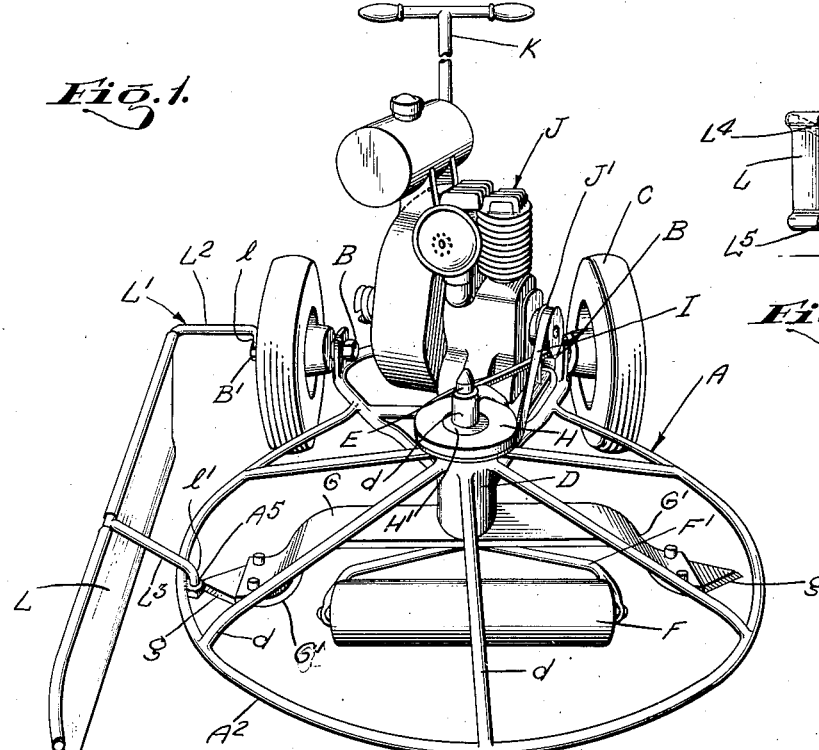
Fig. 1 is a perspective view of the lawn mower embodying the present invention.

In the accompanying drawing, I have illustrated, by way of example, the use of the present invention in, and in connection with, a lawn mower of general type and form shown in the Packwood patent, No. 2,287,126, granted May 21, 1942. The lawn mower shown herein comprises a main framework A, to which are secured the axles B of the two rear main wheels C of the lawn mower. As shown, the wheels C are of conventional rubber tired type and are held in place on the axles B by cap nuts or analogous wheel retaining elements B'. The framework A comprises a vertically disposed tubular part D in front of the wheels B. A non-rotatable post or shaft E extends through the tubular frame part D and is supported by a frame part d above the part D. The front ground engaging device or element of the lawn mower is connected to the lower end of the post E. As shown, said device or element comprises a roller F journaled in supporting arms F' secured to the lower end of the post E. The roller F and arms F' are arranged for rotation of the roller about a horizontal axis transverse to the general direction of movement over the ground.

The frame part D also provides a support for the rotating grass cutter G, which is arranged to rotate about a vertical axis with which the post E is ordinarily coaxial. In the form shown, the cutter structure comprises a metal bar, having a generally horizontal central portion and depending end portions G' to the lower ends of which horizontal outwardly extending cutting blades g are secured. The upper central portion of the cutter is attached to, and is supported and rotated by a depending tubular shaft portion H' of a pulley H, having a depending tubular shaft portion H' which surrounds the post E and extends down through the frame part D. The pulley H is between the frame part D and the frame part d. The upper end of the post E is connected to and supported by the part d. The pulley H and thereby the grass cutter G, is rotated through a belt I by an internal combustion engine J or other motor mounted on the lawn mower framework and having a driving pulley J', about which the belt I is looped. The lawn mower is manually moved, and is guided in its movements through a handle K of conventional form which is attached to the rear portion of the lawn mower framework.

In the form of the invention shown in the drawings, undesirable dispersion or scattering of the severed grass blades is prevented by a vertical grass stop or baffle L, which is supported by the lawn mower framework at the side of the lawn-mower toward which the severed grass blades are thrown by the cutter G. In the desirable form shown, the grass stop L comprises a horizontal supporting bar L' to which two transversely extending arms L² and L³ are rigidly connected. The arm L² is attached to the rear end of the bar L' and terminates at its free end in a depending coupling portion $l$, adapted to extend through and be removably seated in a vertical passage formed in the wheel retaining element B' of the adjacent wheel C. The arm L³ is shown as secured to the bar L' about mid-way between the ends of the latter, and terminates in a depending portion $l'$ which is removably received in a vertical passage formed in a bracket A⁵ welded or otherwise secured to the guard ring portion A² of the lawn mower framework. As shown, the body portion of the arm L² is substantially horizontal, and the body portion of the arm L³ is inclined downwardly from the rod L' to the level of the bracket A⁵, the latter being located at a lower level than the wheel retaining elements B'.

The body of the grass stop or baffle L may advantageously be in form of a suspended curtain made of canvas or analogous material, and having an upper edge portion doubled back on the body of the canvas and stitched or otherwise attached thereto so as to form a hem portion L⁴ through which the rod L' extends. At its lower edge the canvas body of the baffle is formed with a second hem portion L⁵ which receives a metal bar L⁶, which serves as a weight normally holding the baffle in a vertical position. As shown, the upper ends of the rods L' and L⁶ are bent inward toward the center line of the lawn mower, though this is not essential.

As shown, the baffle L is located at the right hand side of the lawn mower as seen by the operator moving the lawn mower over the ground through its handle K. This location of the baffle or stop wall L requires the rotation of the grass cutter to be clockwise as seen by the operator. In normal operation, the cutting effect of each blade $g$ occurs while the blade is moving from left to right through an arcuate portion of its annular path of movement in front of the cutter axis. The motion of each blade $g$ during the portion of a revolution in which its grass cutting action occurs, comprises a variable motion component transverse to the line of lawn mower movement, and a variable component parallel to the line of lawn mower movement. The resultants of those components of the cutting blade movement through successive short sections of the cutting arc are not parallel. However, the general effect of the centrifugal and fan forces to which the severed grass blades are subjected by the rotating cutter, coupled with the restraining effect of the uncut grass in front of the lawn mower, is to throw most of the severed grass blades to the right hand side of the mower. With the baffle L arranged as shown, most of the severed grass blades will impinge against the baffle L unless prevented from doing so by uncut grass along the right hand side of the path of movement of the lawn mower.

In mowing lawns or other grass plots, the mowing action is frequently effected wholly or mainly by such parallel back and forth movements along opposite sides of the unmowed portion of the grass that the severed blades are constantly being thrown into and against the remaining uncut grass. It is usually unnecessary in such case to make use of the baffle until all but a final narrow strip of grass has been cut. If the baffle is then put into use, the bulk of all the grass blades severed thereafter and those severed earlier in the operation, will be thrown against the baffle L and will drop on the ground to form a single row a few inches wide. The cut grass thus concentrated in a single windrow can be readily collected and removed at the completion of the lawn mowing operation.

Figure 4:
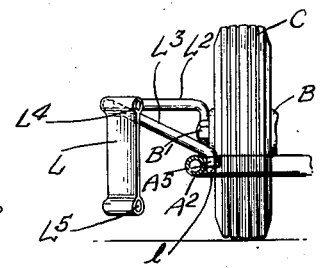
Fig. 4 is an elevation partly in section on the line 4—4 of Fig. 2.
Figure 2:
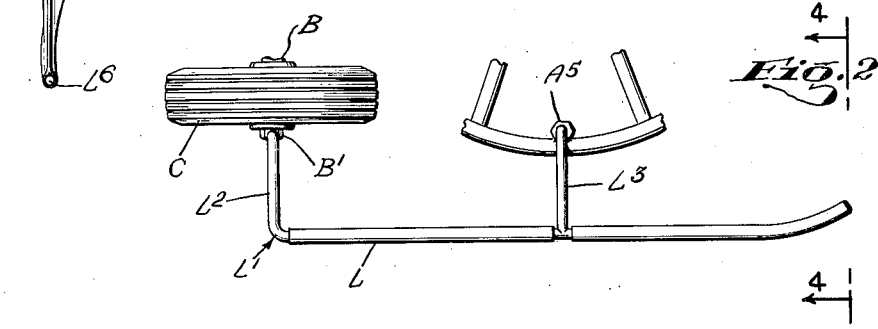
Fig. 2 is a plan view.
Figure 3:
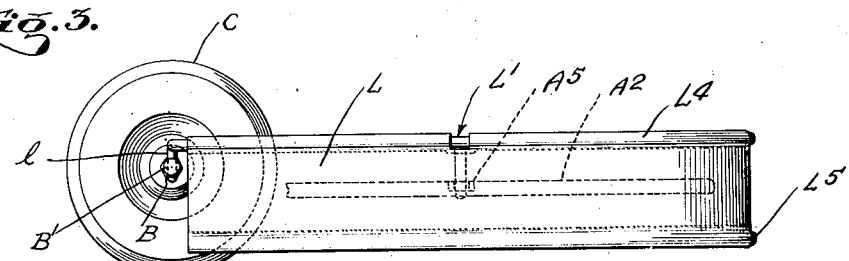
Fig. 3 is an elevation, of a portion of the lawn mower shown in Fig. 1.

The grass arresting baffle L shown and described herein is simple and relatively inexpensive in construction and light of weight, and can be quickly and easily attached to, and removed from, the lawn mower. With its arm or branch L² substantially horizontal and with the arm L³ downwardly inclined as shown in Fig. 4, and with the arm L³ connected to the supporting rod L' about midway between the ends of the latter, the simple connections between the baffle and lawn mower framework provide adequate stability in the support for the baffle.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. For use in a lawn mower comprising a wheeled framework movable over the ground and a grass cutting element mounted in said framework to revolve about a vertical axis and tending to disperse severed grass blades in the space at one side of the lawn mower, the improvement comprising a grass stop at said one side of the lawn mower including a vertical wall elongated in the direction of lawn mower movement over the ground and including supporting parts for the attachment of said wall to the lawn mower framework with the lower edge of the wall displaced upward from the ground, and with the side of the wall adjacent the lawn mower displaced from the periphery of the circular path of movement of the grass cutting element by a horizontal distance substantially greater than the upward displacement of the lower edge of the stop from the ground, whereby the stop is operative to arrest grass blades being thrown to said one side of the lower mower by said cutting element and to deflect them on to the ground to form a single narrow windrow.

2. An improvement as specified in claim 1, in which the grass stop comprises a horizontal supporting bar for use in detachably connecting the grass stop to the lawn mower, and to which the upper edge of said wall is attached and from which wall is suspended.

3. An improvement as specified in claim 1, in which the grass stop comprises a horizontal supporting bar for use in detachably connecting the grass stop to the lawn mower, and a depending flexible wall portion having an upper edge portion attached to said bar, and weighting means attached to said flexible portion adjacent its lower edge to hold said portion taut and in a vertical position.

4. An improvement as specified in claim 1, including a horizontal bar from which said wall is suspended and two transverse arms rigidly attached to said bar for use in connecting the latter to and supporting it from said framework, one of said arms being connected to said bar approximately midway between the ends of the bar, and extending away from the bar in a downwardly inclined direction for connection to said framework at a level lower than the level of said bar, and the other arm being connected to said bar adjacent one end of the latter, and extending away from the bar in a direction different from the first mentioned direction for connection to said framework at a level different from the first mentioned level.

5. A grass stop adapted for detachable connection to the framework of a lawn mower at one side of the latter, comprising a rigid bar with arms rigidly attached to said bar and extending laterally away from the lawnmower and having coupling parts for connections to the lawn mower framework, and a curtain-like body connected to and depending from said bar.

WILLIAM F. SURGI.

REFERENCES CITED

The following references are of record in the file of this patent:

UNITED STATES PATENTS

| Number | Name | Date |
| --- | --- | --- |
| 1,805,927 | Sharp | May 19, 1931 |
| 2,278,922 | Goodall | Apr. 7, 1942 |
| 2,390,321 | Packwood | Dec. 4, 1945 |